(12) United States Patent
Kim

(10) Patent No.: US 9,662,956 B2
(45) Date of Patent: May 30, 2017

(54) DEVICE AND METHOD FOR CONTROLLING AIR SUSPENSION SYSTEM

(71) Applicant: Hyundai Motor Company, Seoul (KR)

(72) Inventor: Jin Kyu Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/938,684

(22) Filed: Nov. 11, 2015

(65) Prior Publication Data

US 2016/0288607 A1    Oct. 6, 2016

(30) Foreign Application Priority Data

Apr. 1, 2015 (KR) .......... 10-2015-0045884

(51) Int. Cl.
| | |
|---|---|
| G06F 19/00 | (2011.01) |
| B60G 17/017 | (2006.01) |
| B60G 17/015 | (2006.01) |
| B60G 17/052 | (2006.01) |
| B60G 17/08 | (2006.01) |

(52) U.S. Cl.
CPC ....... B60G 17/017 (2013.01); B60G 17/0152 (2013.01); B60G 17/0155 (2013.01); B60G 17/052 (2013.01); B60G 17/08 (2013.01); B60G 2400/30 (2013.01); B60G 2500/201 (2013.01); B60G 2600/04 (2013.01); B60G 2600/20 (2013.01); B60G 2800/20 (2013.01)

(58) Field of Classification Search
CPC B60G 15/10; B60G 2202/413; B60G 17/016; B60G 2204/11; B60G 400/0511; B60G 17/015; B60G 17/056; F16F 5/00; G60G 11/14

USPC .......... 701/37; 280/5.5; 267/113; 188/271, 188/300
See application file for complete search history.

(56) References Cited

U.S. PATENT DOCUMENTS

| | | | |
|---|---|---|---|
| 6,247,564 B1 * | 6/2001 | Kim ..................... | B60G 17/005 188/271 |
| 8,840,118 B1 * | 9/2014 | Giovanardi ......... | F15B 13/0444 280/124.157 |
| 9,079,469 B2 * | 7/2015 | Dehmel ................ | B60G 11/27 |
| 2010/0044937 A1 * | 2/2010 | Lee ........................ | B60G 15/10 267/113 |
| 2014/0049013 A1 * | 2/2014 | Dehmel ................ | B60G 11/27 280/6.157 |

(Continued)

FOREIGN PATENT DOCUMENTS

| | | |
|---|---|---|
| JP | 2002-529304 A | 9/2002 |
| JP | 2005-254866 A | 9/2005 |

(Continued)

*Primary Examiner* — McDieunel Marc
(74) *Attorney, Agent, or Firm* — Morgan Lewis & Bockius LLP

(57) ABSTRACT

A method of controlling an air suspension system may include a first process of determining, by a controller, whether a current situation is a parking situation that requires reduced air pressure in an air spring, a second process of maximizing, by the controller, damping force of a shock absorber when the current situation is the parking situation that requires the reduced air pressure in the air spring, and a third process of reducing air pressure in the air spring, by the controller, by bypassing compressed air stored in the air spring to a reservoir tank.

3 Claims, 3 Drawing Sheets

(56) References Cited

U.S. PATENT DOCUMENTS

| | | | |
|---|---|---|---|
| 2014/0265168 A1* | 9/2014 | Giovanardi | F15B 13/0444 280/5.5 |
| 2014/0265169 A1* | 9/2014 | Giovanardi | F15B 13/0444 280/5.5 |
| 2014/0265170 A1* | 9/2014 | Giovanardi | F15B 13/0444 280/5.5 |
| 2015/0224845 A1* | 8/2015 | Anderson | B60G 17/019 701/37 |

FOREIGN PATENT DOCUMENTS

| | | |
|---|---|---|
| JP | 2011-226557 A | 11/2011 |
| KR | 10-2010-0112877 A | 10/2010 |
| KR | 10-2012-0098009 A | 9/2012 |
| KR | 10-2013-0057006 A | 5/2013 |

* cited by examiner

DEVICE AND METHOD FOR CONTROLLING AIR SUSPENSION SYSTEM

CROSS-REFERENCE TO RELATED APPLICATION

The present application claims priority to Korean Patent Application No. 10-2015-0045884 filed Apr. 1, 2015, the entire contents of which is incorporated herein for all purposes by this reference.

BACKGROUND OF THE INVENTION

Field of the Invention

The present disclosure relates to a device and a method for controlling an air suspension system. More particularly, it relates to a device and a method for controlling an air suspension system, which improve durability of a bellows of an air spring, which supports a load of a vehicle when the vehicle is parked, by reducing a fatigue degree of the bellows.

Description of Related Art

A suspension system for a vehicle is an apparatus that blocks vibration or impact, which is transmitted from a road surface while the vehicle travels, from being transmitted directly to a vehicle body, thereby preventing the vehicle body and freight from being damaged, preventing passengers from being injured, and improving ride quality of the vehicle. As main components of the suspension system, there are a chassis spring which attenuates impact transmitted from the road surface, a shock absorber which controls vibration of the chassis spring, a stabilizer bar which prevents rolling motion of the vehicle, and the like.

Among the above components, the shock absorber is mounted between the vehicle body and a wheel in order to absorb vibration, which is caused by impact transmitted to the chassis spring while the vehicle travels, and quickly attenuate the vibration, thereby improving ride quality.

A suspension system, which includes an air spring together with the shock absorber, is called an air suspension system.

Meanwhile, the air spring supports the vehicle body by using elastic force of compressed air, and absorbs and mitigates vibration and impact transmitted from the road surface. Because the air spring is configured to change air pressure in a bellows by using a separate compressor, the air spring may adjust a height of the vehicle body by adjusting air pressure in the bellows, thereby maintaining a predetermined height of the vehicle body regardless of the number of occupants.

The bellows, which is one of the components of the air spring, is an extendable and contractible air chamber that accommodates compressed air, and always receives air pressure at a predetermined level. Therefore, the bellows is manufactured by arranging cord yarns and rubber at predetermined intervals so as to have a structure that is advantageous to tensile force in order to withstand very high air pressure.

However, the bellows having the above structure also has problems in that the rubber portions burst which cause pinholes while the cord yarn and the rubber are separated from each other due to a load transmitted in a field, an air leak occurs due to the pinholes, and as a result, the air spring cannot support the vehicle body, whereby the vehicle collapses.

In order to solve the above problems, a number of man hours (M/H) are required to find out influential factors that affect a lifespan of the bellows.

Because the method of using the cord yarn and rubber to manufacture the bellows has advantages and disadvantages in terms of behavior properties of the air spring, a bellows with an axial ply structure which has wrinkled portions that extend in an axial direction, a bellows with a cross ply structure which has wrinkled portions that extend in a diagonal direction and intersect each other, and the like are applied. However, even though any one of the bellows with the above structures is selected and applied to the air spring, it is difficult to basically solve the problems in respect to the occurrence of the pinholes in the bellows because the pinholes are formed in the field as time passed in a state in which the air spring is mounted in the vehicle.

In the field, the pinholes formed in the bellows of the air spring are caused by physical properties of the rubber material that constitutes the bellows. The air spring always accommodates high-pressure air in the bellows in order to support a load of the vehicle, and accordingly, age-hardening gradually occurs at folded portions of the bellows, which are exposed to high air pressure, such that the bellows is permanently deformed, and an elongation percentage of the bellows deteriorates. Therefore, the pinholes are formed by fatigue caused by repetitive extension and contraction in up and down directions at the folded portions of the bellows which are weakened.

Since the bellows supports the load of the vehicle not only when the vehicle travels but also when the vehicle is stopped over a long period of time such as when the vehicle is parked, fatigue is accumulated on the bellows.

Meanwhile, according to a result of statistically analyzing actual driving time of the vehicle, the driving time of the vehicle is less than half a period of time for which a user owns the vehicle, and therefore, it may be considered that the vehicle is parked for most of the period of time for which the user owns the vehicle.

In general, the suspension system of the vehicle or components of the vehicle body are not damaged by fatigue in a mode in which there is no repetitive load such as when the vehicle is parked. However, a component such as the bellows of the air spring is damaged by fatigue even when the vehicle is left unattended over a long period of time such as when the vehicle is parked because the component needs to support a high load of the vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a device and a method for controlling an air suspension system, in which when the vehicle is parked over a long period of time, air pressure of the air spring is reduced to a predetermined level, an oil flow path in a shock absorber is blocked to allow a predetermined height of the vehicle to be maintained by the shock absorber, such that the load of the vehicle, which is supported by the air spring, is supported by the shock absorber when the vehicle is parked, thereby improving durability of the bellows.

According to various aspects of the present invention, a method of controlling an air suspension system may include a first process of determining, by a controller, whether a current situation is a parking situation that requires reduced air pressure in an air spring, a second process of maximizing, by the controller, damping force of a shock absorber when the current situation is the parking situation that requires the reduced air pressure in the air spring, and a third process of reducing air pressure in the air spring, by the controller, by bypassing compressed air stored in the air spring to a reservoir tank.

The first process may include receiving a parking time selected by a user in a situation in which an engine is turned off after a vehicle is parked, and determining that it is required to reduce air pressure in the air spring when the parking time selected by the user is equal to or more than a predetermined reference time after comparing the parking time selected by the user with the predetermined reference time.

In the first process, when the user does not select the parking time when the engine is turned off, vehicle motion may be detected for a predetermined time after the vehicle is parked, and when the vehicle motion does not occur in accordance with the detection result, it may be determined that it is required to reduce air pressure in the air spring.

According to various aspects of the present invention, a device for controlling an air suspension system may include a servo valve configured to be embedded in a shock absorber and to control damping force of the shock absorber, a check valve disposed between an air spring and a reservoir tank, and configured to control a flow of compressed air that is bypassed from the air spring to the reservoir tank, and a controller configured to turn off the servo valve to maximize damping force of the shock absorber, and to operate the check valve to bypass compressed air stored in the air spring to the reservoir tank so as to reduce air pressure in the air spring when it is determined that a current situation is a parking situation that requires reduced air pressure in the air spring.

According to the present invention, a fatigue load applied to weakened portions (folded portions) of the bellows of the air spring is reduced in a situation in which the vehicle is parked, thereby preventing the weakened portions from being damaged, and contributing to improving durability of the bellows.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

As known, an air suspension system includes an air spring which mitigates impact transmitted from a road surface when a vehicle travels, and a shock absorber which controls vibration of the air spring.

In order to perform a function of absorbing shock when the vehicle travels, the air spring uses a compressor which compresses air and produces compressed air, a reservoir tank which stores the compressed air supplied from the compressor, and a solenoid valve which controls a flow of the compressed air between the reservoir tank and the air spring.

Figure 1:
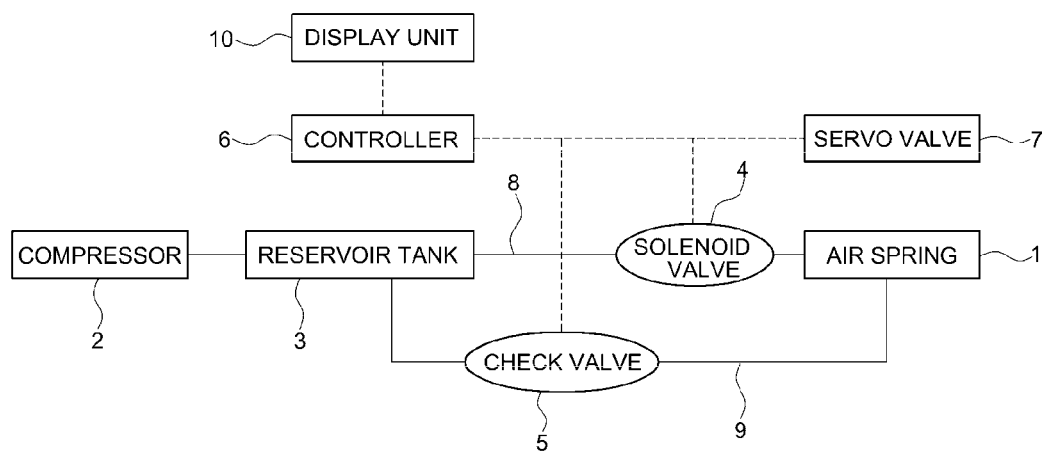
FIG. 1 is a view illustrating a configuration for explaining an exemplary method of controlling an air suspension system according to the present invention.

The attached FIG. 1 is an exemplified view illustrating a configuration for explaining a method of controlling an air suspension system according to the present invention.

As illustrated in FIG. 1, the air suspension system according to the present invention includes an air spring 1, and a compressor 2, a reservoir tank 3, and a solenoid valve 4 which serve to operate the air spring 1.

The air spring 1 serves to mitigate impact transmitted from the road surface by using elastic force of the compressed air, and uses a bellows as an air chamber, in which volume and pressure are changed by extension and contraction of the bellows.

As described above, the compressed air produced by the compressor 2 is stored in the reservoir tank 3, and when the vehicle travels, a flow of the compressed air between the reservoir tank 3 and the air spring 1 (specifically, the bellows) is controlled by the solenoid valve 4.

A bypass line 9 is connected between the air spring 1 and the reservoir tank 3 separately from an air line 8 in which the solenoid valve 4 is mounted, and a check valve 5, which controls an air flow from the bellows of the air spring 1 to the reservoir tank 3, is installed in the bypass line 9.

The check valve 5 is an electronic valve that is operated by a control signal from a controller 6, and bypasses the compressed air from the bellows of the air spring 1 to the reservoir tank 3 when the vehicle is parked, thereby reducing a degree of fatigue occurring in the bellows due to air pressure.

The controller 6 controls an operation of the solenoid valve 4 and the check valve 5, and controls an operation of a servo valve 7 embedded in an electronic shock absorber which controls vibration and behavior of the air spring 1.

The electronic shock absorber, which meets electronic stability control (ESC) specifications, has therein the servo valve that is operated in an electronic control manner and controls an oil flow path, and typically controls an opening degree of the oil flow path by an operation of the servo valve, thereby adjusting damping force.

In general, when the vehicle travels, the shock absorber, which meets the ESC specifications, controls the behavior of the air spring by using damping force that is generated when incompressible hydraulic oil stored in the shock absorber passes through the oil flow path adjusted by the servo valve.

Here, the controller 6 controls the operation of the servo valve 7 embedded in the shock absorber to control the damping force of the shock absorber, and particularly, controls the operation of the servo valve 7 so as to maximize the damping force of the shock absorber, thereby allowing the shock absorber to support a load of the vehicle when the vehicle is parked.

That is, the servo valve 7 of the shock absorber controls the oil flow path of the shock absorber based on a signal from the controller 6, thereby controlling the damping force of the shock absorber.

Here, a method of controlling the air suspension system according to the present invention, which is based on the above configurations, will be described below with reference to the attached FIG. 2.

Figure 2:
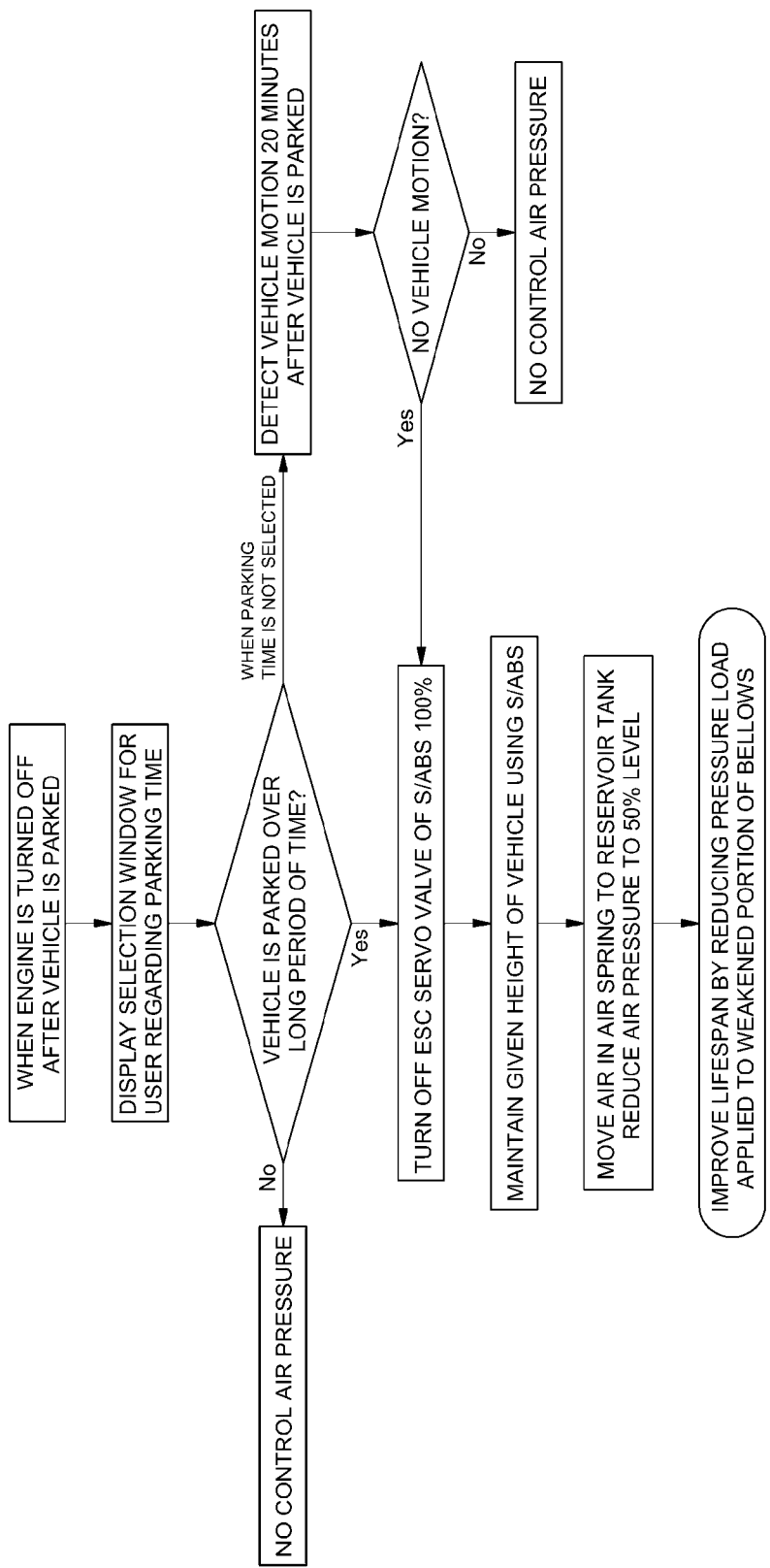
FIG. 2 is a flowchart for explaining the exemplary method of controlling the air suspension system according to the present invention.

First, as illustrated in FIG. 2, in order to determine whether the current situation is a parking situation that requires reduced air pressure and fatigue in the air spring 1, when an engine is turned off after the vehicle is stopped and parked, a selection window is displayed on a display unit 10 so that a user may select a parking time.

When it is determined that the engine is turned off after the vehicle is stopped and parked, the controller 6 outputs the selection window, which is configured to enable the user to select various parking times (e.g., less than 20 minutes, equal to or more than 20 minutes, and the like), on the display unit 10 provided in the interior of the vehicle, and receives the selection by the user.

When the parking time selected by the user using the display unit 10 is input, the controller 6 compares the input parking time with a predetermined reference time, and when the parking time selected by the user is equal to or more than the predetermined reference time in accordance with the comparison result, the controller 6 determines that it is required to reduce air pressure in the air spring 1 (turning off the ESC servo valve).

When the parking time selected by the user is less than the predetermined reference time in accordance with the comparison result, the controller 6 determines that it is not required to reduce air pressure in the air spring 1, and does not control the air pressure in the air spring 1 in the parking situation.

Here, the reference time is a parking time for which fatigue damage may occur to the bellows of the air spring, and the reference time is determined as a value obtained through prior experiments and evaluations under an actual vehicle condition, and then stored in the controller.

When the user does not select the parking time displayed on the display unit 10, the controller 6 detects vehicle motion for a predetermined time after the vehicle is parked, and when it is determined that the vehicle motion does not occur in accordance with the detection result, the controller 6 determines that it is required to reduce air pressure in the air spring 1.

In this case, the controller 6 may determine whether the vehicle motion occurs by using a motion sensor or the like mounted in the vehicle.

The predetermined time is a parking time by which it may be considered that the vehicle is parked over a long period of time in a case in which the user does not select the parking time, and the predetermined time is stored in the controller, and may be arbitrarily set or may be determined as a parking time for which fatigue damage may occur to the bellows of the air spring.

When it is determined that the vehicle motion occurs in accordance with the detection result of the vehicle motion, the controller 6 determines that it is not required to reduce air pressure in the air spring 1, and does not control the air pressure in the air spring 1.

When it is determined that the current situation is the parking situation that requires reduced air pressure in the air spring 1 as described above, the controller 6 controls the operation of the servo valve 7 of the shock absorber, and maximizes damping force of the shock absorber.

The controller operates the servo valve 7 of the shock absorber to be turned off at 100%, and blocks the oil flow path of the shock absorber 100%, thereby maximally increasing damping force caused by hydraulic oil stored in the shock absorber.

The shock absorber with maximized damping force may support the load of the vehicle as a substitute for the air spring 1, and as a result, the height of the vehicle body may be fixedly maintained to a predetermined level.

After the controller 6 allows the shock absorber to support the load of the vehicle as described above, the controller 6 bypasses the compressed air stored in the air spring 1 to the reservoir tank 3, thereby reducing air pressure in the bellows of the air spring 1.

The controller 6 operates the check valve 5 configured between the air spring 1 and the reservoir tank 3, and bypasses the compressed air stored in the bellows of the air spring 1 to the reservoir tank 3, thereby reducing air pressure in the bellows of the air spring 1 to a predetermined reference pressure.

The reference pressure is determined as a pressure value that may reduce fatigue damage to the bellows due to air pressure in the bellows, and stored in the controller 6, and the reference pressure may be obtained through prior experiments and evaluations, or may be set as a typical value that may reduce a fatigue load applied to the bellows.

For example, the controller 6 bypasses the compressed air stored in the bellows of the air spring 1 to the reservoir tank 3, thereby reducing air pressure in the bellows to 50% of maximum air pressure in the bellows.

When air pressure in the air spring 1 is reduced, a fatigue degree applied to the bellows by air pressure is reduced, and as a result, a pressure load applied to the folded portions of the bellows, which are vulnerable to high air pressure, is reduced, thereby improving durability and a lifespan of the bellows.

As described above, the present invention prevents the bellows of the air spring from receiving a fatigue load that is caused because the bellows supports the load of the vehicle, by maximizing damping force of the shock absorber, and prevents the bellows of the air spring from receiving a fatigue load caused by high air pressure by bypassing air pressure in the air spring to the reservoir tank, in a parking situation (mode) except for a traveling situation, thereby reducing a degree of fatigue damage to the bellows to prevent the occurrence of the pinhole, and improving a lifespan of the bellows.

Meanwhile, a process of filling the bellows of the air spring with air pressure again when the vehicle travels will be described with reference to FIG. 3.

When the engine of the vehicle is turned on during a process of reducing a fatigue load applied to the bellows in a situation in which the vehicle is parked over a long period of time as described above, the solenoid valve 4, which is installed in the air line 8 of the air spring 1, is operated to move the compressed air stored in the reservoir tank 3 to the air spring 1.

Figure 3:
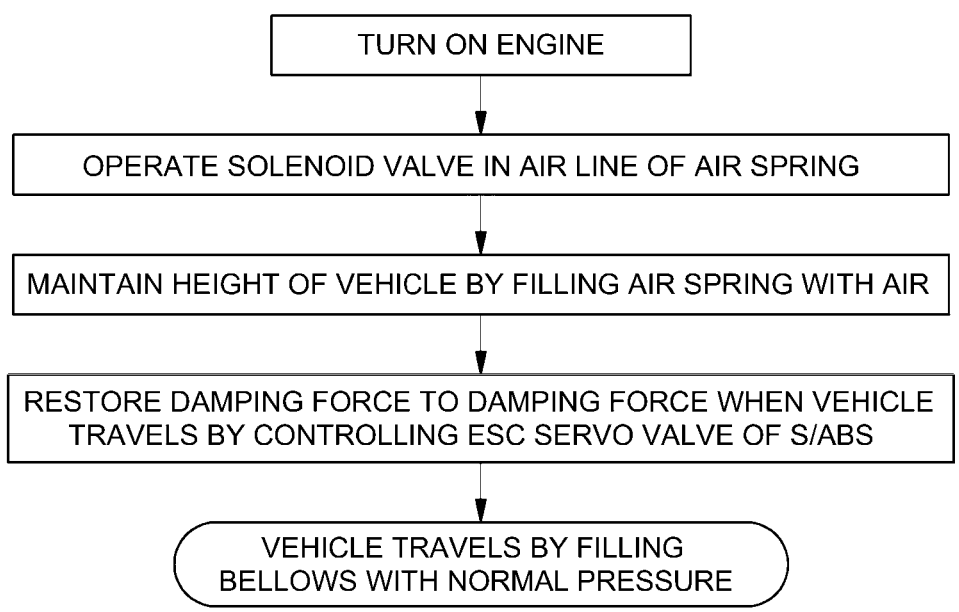
FIG. 3 is a flowchart for explaining a return control process for normally operating the air suspension system when an engine is started while the air suspension system according to the present invention is controlled.

As illustrated in FIG. 3, when the engine of the vehicle is turned on, the controller 6 determines that the vehicle is out of the parking situation and placed in the traveling situation, moves the compressed air stored in the reservoir tank 3 to the bellows of the air spring 1 through the solenoid valve 4 in the air line 8 so that the bellows is filled with the compressed air, thereby allowing the air spring 1 to support the load of the vehicle to maintain the height of the vehicle.

The controller 6 controls the operation of the electronic servo valve 7 of the shock absorber, and adjusts the opening degree of the oil flow path for allowing the flow of hydraulic oil, thereby restoring damping force of the shock absorber to damping force that is required when the vehicle travels.

As described above, in a case in which the vehicle is operated in the traveling mode again as described above, air pressure in the air spring and damping force of the shock absorber are restored and maintained to a normal level when the vehicle travels, thereby allowing the vehicle to normally travel.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of controlling an air suspension system, comprising:
   a first process of determining, by a controller, whether a current situation is a parking situation that requires reduced air pressure in an air spring;
   a second process of maximizing, by the controller, damping force of a shock absorber when the current situation is the parking situation that requires the reduced air pressure in the air spring; and
   a third process of reducing air pressure in the air spring, by the controller, by bypassing compressed air stored in the air spring to a reservoir tank,
   wherein the first process includes:
      receiving a parking time selected by a user in a situation in which an engine is turned off after a vehicle is parked; and
      determining that air pressure is required to be reduced in the air spring when the parking time selected by the user is equal to or more than a predetermined reference time after comparing the parking time selected by the user with the predetermined reference time.

2. The method of claim 1, wherein in the first process, when the user does not select the parking time when the engine is turned off, vehicle motion is detected for a predetermined time after the vehicle is parked, and when the vehicle motion does not occur in accordance with the detection result, the controller is configured to determine that the air spring is required to reduce air pressure in the air spring.

3. A device for controlling an air suspension system, comprising:
   a servo valve configured to be embedded in a shock absorber and to control damping force of the shock absorber;
   a check valve disposed between an air spring and a reservoir tank, and configured to control a flow of compressed air that is bypassed from the air spring to the reservoir tank; and
   a controller configured to turn off the servo valve to maximize damping force of the shock absorber, and to operate the check valve to bypass compressed air stored in the air spring to the reservoir tank so as to reduce air pressure in the air spring when the controller determines that a current situation is a parking situation that requires reduced air pressure in the air spring.

\* \* \* \* \*